United States Patent
Schroter et al.

(10) Patent No.: US 8,549,255 B2
(45) Date of Patent: Oct. 1, 2013

(54) MICROPROCESSOR, METHOD AND COMPUTER PROGRAM PRODUCT FOR DIRECT PAGE PREFETCH IN MILLICODE CAPABLE COMPUTER SYSTEM

(75) Inventors: David A. Schroter, Round Rock, TX (US); Mark S. Farrell, Pleasant Valley, NY (US); Jennifer Navarro, Poughkeepsie, NY (US); Chung-Lung Kevin Shum, Wappingers Falls, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 12/032,041

(22) Filed: Feb. 15, 2008

(65) Prior Publication Data
US 2009/0210662 A1   Aug. 20, 2009

(51) Int. Cl.
*G06F 12/00* (2006.01)

(52) U.S. Cl.
USPC ........... 711/213; 711/122; 711/137; 712/205; 712/207

(58) Field of Classification Search
None
See application file for complete search history.

(56) References Cited

U.S. PATENT DOCUMENTS

| | | | | |
|---|---|---|---|---|
| 6,138,213 | A | * | 10/2000 | McMinn ................. 711/137 |
| 6,832,296 | B2 | * | 12/2004 | Hooker ................... 711/137 |
| 6,848,028 | B1 | | 1/2005 | Sugumar et al. |
| 2006/0179236 | A1 | * | 8/2006 | Shafi ...................... 711/137 |

OTHER PUBLICATIONS z/Architecture: "Principles of Operation"; Sixth Edition; p. 7-89 to 7-91 and 7-179 to 7-183; Apr. 2007.

* cited by examiner

*Primary Examiner* — Jared Rutz
*Assistant Examiner* — Alan Otto
(74) *Attorney, Agent, or Firm* — Cantor Colburn LLP; John Campbell

(57) ABSTRACT

A microprocessor equipped to provide hardware initiated prefetching, includes at least one architecture for performing: issuance of a prefetch instruction; writing of a prefetch address into a prefetch fetch address register (PFAR); attempting a prefetch according to the address; detecting one of a cache miss and a cache hit; and if there is a cache miss, then sending a miss request to a next cache level and attempting cache access in a non-busy cycle; and if there is a cache hit, then incrementing the address in the PFAR and completing the prefetch. A method and a computer program product are provided.

17 Claims, 1 Drawing Sheet

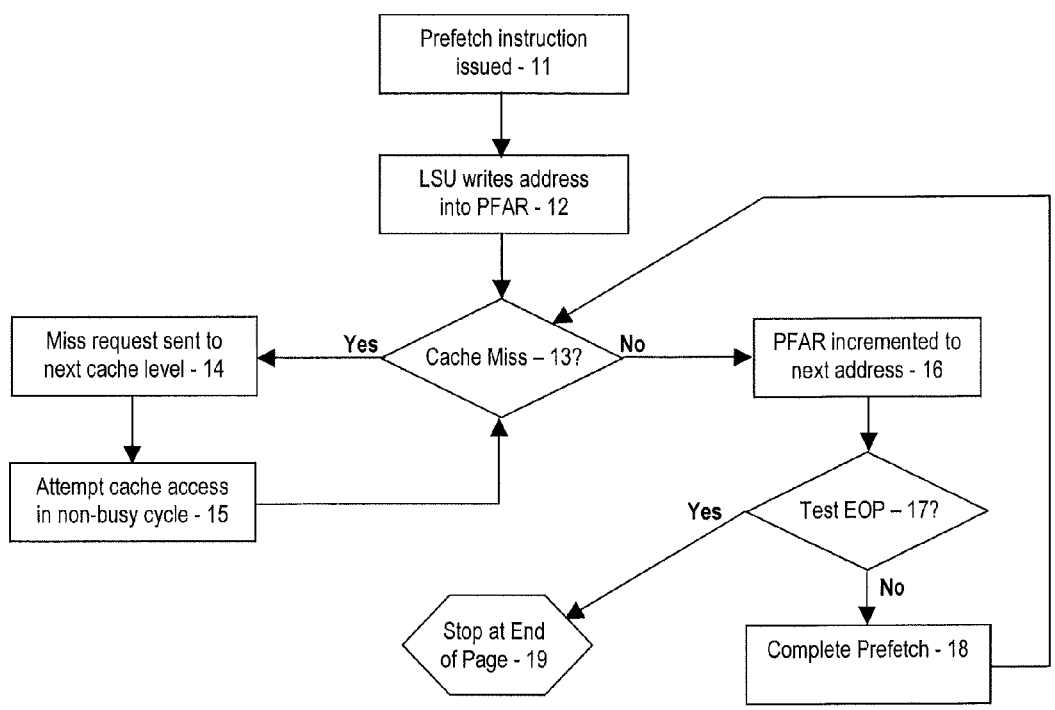

MICROPROCESSOR, METHOD AND COMPUTER PROGRAM PRODUCT FOR DIRECT PAGE PREFETCH IN MILLICODE CAPABLE COMPUTER SYSTEM

BACKGROUND OF THE INVENTION

This invention relates to methods and architecture of a processor (or microprocessor) for prefetching from memory.

Presently, hardware initiated stride prefetching is used in microprocessors to detect accesses to memory that exhibit a striding pattern, and then prefetch cache lines into caches by predicting future memory configurations by relying on the associated striding pattern. Most of the algorithms used by the hardware rely on detecting repeated accesses to memory addresses. For example, access to memory addresses may show a striding pattern of X, X+y, X+2y where y is the stride distance. The algorithm is then employed to prefetch X+3y, etc. Some microprocessors implement aggressive algorithms to prefetch considerable data from memory. For example, where the aggressive algorithm detects a fairly repeated pattern, the algorithm may provide for prefetching the stride pattern predicted addresses until the end of a page. Usually, when prefetching a page, information regarding actual hardware implementation of the prefetch engine is required for the software. This information may be used to train the prefetch engine.

One problem with this traditional design for prefetching is that it requires that the software team understand a microarchitecture of a specific hardware prefetch engine training algorithm. This may require different code generation for different processor designs, even when architecture for the prefetching engine is unchanged. Further, this may restrict the flexibility and aggressiveness of a prefetch engine design. That is, if the prefetch engine is not well matched to the processor design, the desired performance benefit might not be obtained.

What are needed are techniques for performing reliable prefetching in a processor, while maintaining flexibility of design and providing reliable performance.

BRIEF SUMMARY OF THE INVENTION

An exemplary embodiment includes a microprocessor equipped to provide hardware initiated prefetching, includes at least one architecture for performing: issuance of a prefetch instruction; writing of a prefetch address into a prefetch fetch address register (PFAR); attempting a prefetch according to the address; detecting one of a cache miss and a cache hit; and if there is a cache miss, then sending a miss request to a next cache level and attempting cache access in a non-busy cycle; and if there is a cache hit, then incrementing the address in the PFAR and completing the prefetch.

An embodiment of a method for hardware initiated prefetching includes: issuing a prefetch instruction; writing a prefetch address into a prefetch fetch address register (PFAR); attempting a prefetch according to the address; detecting one of a cache miss and a cache hit; and if there is a cache miss, then sending a miss request to a next cache level and attempting cache access in a non-busy cycle; and if there is a cache hit, then incrementing the address in the PFAR and completing the prefetch.

A computer program product stored on machine readable media and including machine executable instructions for performing hardware initiated prefetching in a microprocessor equipped for prefetching, includes instructions for: issuing a prefetch instruction; writing a prefetch address into a prefetch fetch address register (PFAR) of the microprocessor; attempting a prefetch according to the address; detecting one of a cache miss and a cache hit; and if there is a cache miss, then sending a miss request to a next cache level and attempting cache access in a non-busy cycle; and if there is a cache hit, then incrementing the address in the PFAR and completing the prefetch.

BRIEF DESCRIPTION OF THE DRAWINGS

Referring now to the drawings wherein like elements are numbered alike in the several figures, wherein:

FIG. 1 illustrates one example of a process for prefetching to an end of page.

DETAILED DESCRIPTION OF EXEMPLARY EMBODIMENTS

This invention provides instructions such that software can directly arm a prefetch engine to prefetch to an end of page. This is in particular designed for millicode handling of instructions, but could possibly be changed to a general software usage. With the millicode mode only activation, the use can be limited to a controlled environment and only for implementing instructions that will directly benefit from the use.

In a long operand instruction, it is possible to determine the amount of data that will be required for the execution of the instruction. One example is that of MVCL/CLCL in the IBM z-Architecture. When this is implemented by millicode in a microprocessor, the millicode can calculate whether the required accesses will have memory page crossing. If a page crossing is detected, millicode can directly arm a hardware prefetch engine to fetch to end of a page using a single instruction. This negates the necessity of training the hardware engine by code. This also allows a hardware prefetch engine to do page prefetch only when told, without the use of any aggressive algorithms. More importantly, this can be done with a fairly simple state machine even if no stride prefetch engine is provided in a microprocessor. By providing an instruction that indicates prefetch to end of page is desired, software can issue a prefetch instruction. In some embodiments, the prefetch instruction will issue with the starting address.

Note that as used herein, the term "millicode" generally makes reference to instructions borne by (i.e., supplied by) the microprocessor. In contrast, "software" includes instructions that generally originate from beyond the processor, such as from storage or memory.

Once the prefetch instruction is issued, a LSU (load store unit) can then write the address into a PFAR (prefetch fetch address register) when the instruction is executed. Since the address includes a prefetch instruction, it will not block the pipe when it encounters a cache miss. If a cache miss is detected, a miss request will be sent to the next level cache. If a cache hit is detected, the PFAR will be incremented to the next line address. The PFAR state machine will access the cache in a non-busy cycle, and launch a miss request if cache miss in encountered, otherwise the PFAR address will be incremented again. This process continue until the end of page is detected. If the amount of miss resource is used up, the PFAR state machine will stop until some resource is freed up. This process is shown in FIG. 1.

Referring now to FIG. 1, there is shown an exemplary flow chart depicting aspects of prefetching. In this example for prefetching to end of page 10, a first stage 111 is the issuance of the prefetch instruction. In a second stage 12, the load/store unit writes an initial prefetch address into the PFAR. In a third stage 13, prefetching tests for a cache miss. In a first branch stage 14, if there is a cache miss, the prefetch request is sent to the next cache level. Subsequently, in a second branch stage 15, prefetching attempts cache access during a non-busy cycle 15. Again, prefetching tests for a cache miss. In a first stage of an alternate branch 16, if there is a cache hit (i.e., no cache miss), then the PFAR is incremented for the next prefetch address. In a second stage of the alternate branch 17, testing for the end of the page is performed. If this is not the end of the page, prefetching from the address 18 in completed. The process then resumes with the third stage 13. In a last stage 19, prefetching reaches the end of the page and stops.

In some embodiments, such as for z-Architecture instructions which usually includes two sets of operands in a "storage and storage operation" (SS*) format instructions, the hardware will provide two such state machines, in order to provide maximum benefit.

An additional instruction is also provided to millicode to stop the page prefetch engine from prefetching. This additional instruction may be useful in cases where the millicode later detected that some kind of interrupt or exception is encountered. In other embodiments, the hardware itself may also provide a stop mechanism if some forms of millicode end is detected as in end of millicode sequence or if a program interrupt is encountered.

In this embodiment, the instruction provided to millicode is by overloading existing IBM z/Architecture instructions Prefetch Data (PFD) and Prefetch Data Relative Long (PDFRL). The hardware will allow an undefined M1 code-points of A and B to be used only if in millicode mode. A code-point of "A" will instruct the hardware engine to prefetch data for store access till end of page, while a code-point of "B" will instruct the hardware engine to prefetch data for conditional store access till end of page. Note that if these code-points are used outside of millicode mode, nothing will be done as indicated by z-Architecture.

Technical effects and benefits include architecture, methods and techniques for performing reliable prefetching in a processor, while maintaining flexibility of design and providing reliable performance. The methods may be implemented by the architecture, millicode, software, or in various combinations.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A processor configured to provide hardware initiated prefetching, the processor configured to perform:
   issuing a single prefetch instruction from millicode in the processor outside of a hardware prefetch engine, the issuing based on detection of a page crossing by the millicode;
   writing a prefetch address into a prefetch address register (PFAR);
   fetching to an end of page using the single prefetch instruction, by:
   a) attempting a prefetch according to the prefetch address;
   b) detecting one of a first level cache miss and a first level cache hit;
   c) sending a miss request to a next level cache and attempting cache access of the next level cache in a non-busy cycle, based on detecting a first level cache miss;
   d) incrementing the address in the PFAR and completing the prefetch, based on detecting a cache hit; and
   repeating a) thorough d) until the end of page is detected;
   wherein the sending of a miss request is based on determining that a miss resource is available, and prefetching is stopped using a stop instruction based on detecting one of an interrupt and an exception.

2. The processor as in claim 1, wherein incrementing the address comprises incrementing the address to a next line address.

3. The processor as in claim 1, wherein incrementing the address comprises incrementing the address according to an algorithm.

4. The processor as in claim 1, wherein incrementing the address comprises incrementing the address by a selected stride distance.

5. The processor as in claim 1, further comprising waiting for resources based on there being one of a cache miss and a cache hit.

6. The processor as in claim 1, further comprising a stop mechanism.

7. The processor as in claim 1, wherein performing is initiated by at least one instruction in millicode.

8. The processor as in claim 1, wherein writing is performed by a load store unit.

9. A method for hardware initiated prefetching, the method comprising:
   issuing a single prefetch instruction from millicode in the processor outside of a hardware prefetch engine, the issuing based on detection of a page crossing by the millicode;

writing a prefetch address into a prefetch address register (PFAR);
fetching to an end of page using the single prefetch instruction, by:
a) attempting a prefetch according to the address;
b) detecting one of a first level cache miss and a first level cache hit;
c) sending a miss request to a next level cache and attempting cache access of the next level cache in a non-busy cycle, based on detecting a first level cache miss;
d) incrementing the address in the PFAR and completing the prefetch based on detecting a cache hit; and
repeating a) thorough d) until the end of page is detected;
wherein the sending of a miss request is based on determining that a miss resource is available, and prefetching is stopped using a stop instruction based on detecting one of an interrupt and an exception.

10. A computer program product stored on non-transitory machine readable media and comprising machine executable instructions for performing hardware initiated prefetching in a processor equipped for prefetching, the product comprising instructions for: issuing a single prefetch instruction from millicode in the processor outside of a hardware prefetch engine, the issuing based on detection of a page crossing by the millicode; writing a prefetch address into a prefetch address register (PFAR); fetching to an end of page using the single prefetch instruction, by: a) attempting a prefetch according to the address; b) detecting one of a first level cache miss and a first level cache hit; c) sending a miss request to a next level cache and attempting cache access of the next level cache in a non-busy cycle, based on detecting a first level cache miss; d) incrementing the address in the PFAR and completing the prefetch, based on detecting a cache hit; and repeating a) thorough d) until the end of page is detected; wherein the sending of a miss request is based on determining that a miss resource is available, and prefetching is stopped using a stop instruction based on detecting one of an interrupt and an exception.

11. The computer program product as in claim 10, comprising at least one of millicode and software.

12. The computer program product as in claim 10, wherein a portion of the writing, attempting, detecting, sending, attempting, incrementing and completing is performed by millicode.

13. The computer program product as in claim 10, wherein a portion of the writing, attempting, detecting, sending, attempting, incrementing and completing is performed by software.

14. The computer program product as in claim 10, further comprising instructions for arming a hardware prefetch engine.

15. The method as in claim 9, wherein performing is initiated by at least one instruction in millicode.

16. The method as in claim 9, wherein writing is performed by a load store unit.

17. The method as in claim 9, further comprising waiting for resources based on to detecting one of a cache miss and a cache hit.

\* \* \* \* \*